US007908568B1

(12) United States Patent
Gaul et al.

(10) Patent No.: US 7,908,568 B1
(45) Date of Patent: Mar. 15, 2011

(54) METHOD OF DISPLAYING GRAPHICAL OBJECTS

(75) Inventors: Troy A. Gaul, Shoreview, MN (US); Timothy J. Gogolin, Minneapolis, MN (US)

(73) Assignee: Adobe Systems Incorporated, San Jose, CA (US)

(*) Notice: Subject to any disclaimer, the term of this patent is extended or adjusted under 35 U.S.C. 154(b) by 1166 days.

(21) Appl. No.: 11/097,507

(22) Filed: Apr. 1, 2005

(51) Int. Cl.
*G06F 3/048* (2006.01)

(52) U.S. Cl. ........ 715/794; 715/790; 715/768; 715/781; 715/788; 715/792; 715/700

(58) Field of Classification Search ................... 715/792, 715/788, 768, 794, 790, 781, 764, 700; 345/159
See application file for complete search history.

(56) References Cited

U.S. PATENT DOCUMENTS

| 5,841,420 | A | * | 11/1998 | Kaply et al. | 345/421 |
| 5,859,639 | A | * | 1/1999 | Ebrahim | 715/788 |
| 6,411,310 | B1 | * | 6/2002 | Berquist et al. | 715/764 |
| 6,466,199 | B2 | * | 10/2002 | Takase et al. | 345/159 |
| 6,760,048 | B1 | * | 7/2004 | Bates et al. | 715/797 |
| 6,954,905 | B2 | * | 10/2005 | Brown et al. | 715/768 |
| 7,155,682 | B2 | * | 12/2006 | Rodden et al. | 715/788 |
| 2004/0261037 | A1 | * | 12/2004 | Ording et al. | 715/788 |
| 2005/0149879 | A1 | * | 7/2005 | Jobs et al. | 715/796 |

OTHER PUBLICATIONS

Merriam-Webster [online] [retrieved on Jun. 3, 2010]. Retrieved from the Internet:< URL: http://www.merriam-webster.com/dictionary/metadata>.*

* cited by examiner

*Primary Examiner* — Tadeese Hailu
*Assistant Examiner* — Darrin Hope
(74) *Attorney, Agent, or Firm* — Kilpatrick Townsend & Stockton LLP

(57) ABSTRACT

A method and computer program product for displaying graphical objects in a display is presented. A first input from a user is received. In response to receiving the first input, a graphical object is displayed in the display. A second input is then received from the user. In response to receiving the second input, the graphical object is fixated in the display. An object that would have otherwise been occluded by the graphical object is then displayed in an area of the display outside the area occupied by the graphical object.

17 Claims, 6 Drawing Sheets

METHOD OF DISPLAYING GRAPHICAL OBJECTS

BACKGROUND

A graphical user interface (GUI) is a human-computer interface which is used to interact with computer applications. A GUI typically uses windows, icons and menus which can be manipulated by a mouse and/or keyboard to provide certain functions.

A window is a portion of the monitor screen that can display its contents (e.g., a program, icons, a text file or an image) independently of the rest of the display screen. Multiple windows can be open simultaneously. Each window can display a different application, or each can display different files (e.g., text, image or spreadsheet files) that have been opened or created with a single application.

An icon is a small picture or symbol in a GUI that represents a program, a command, a file, a directory or a device (such as a hard disk or floppy). Icons are used both on the desktop and within application programs. Examples include small rectangles (to represent files), file folders (to represent directories), a trash can (to indicate a place to dispose of unwanted files and directories) and buttons on web browsers (for navigating to previous pages, for reloading the current page, etc.).

Commands are issued in the GUI by using a mouse, trackball, touch pad or keyboard to first move a pointer on the screen to, or on top of, the icon, menu item or window of interest in order to select that object. Then, for example, icons and windows can be moved by dragging (moving the mouse with the mouse button held down) and objects or programs can be opened by clicking on their icons.

GUIs may also allow a user to call up a dialog box or panel which is typically a small temporary window in a graphical user interface that appears in order to request information from the user. After the information has been provided, the user can dismiss the dialog box.

GUIs make computer operation more intuitive, and thus easier to learn and use. For example, it is much easier for a new user to move a file from one directory to another by dragging its icon with the mouse than by having to remember and type commands to accomplish the same task.

GUIs generally provide users with immediate, visual feedback about the effect of each action. For example, when a user deletes an icon representing a file, the icon immediately disappears, confirming that the file has been deleted (or at least sent to the trash can). This contrasts with the situation for a Command Line Interface (CLI), in which the user types a delete command (inclusive of the name of the file to be deleted) but receives no automatic feedback indicating that the file has actually been removed.

In addition, GUIs allow users to take full advantage of the powerful multitasking (the ability for multiple programs and/or multiple instances of single programs to run simultaneously) capabilities of modern operating systems by allowing such multiple programs and/or instances to be displayed simultaneously. The result is a large increase in the flexibility of computer use and a consequent rise in user productivity.

The use of Graphical User Interfaces (GUIs) is ubiquitous. GUIs are used for all types of computer related operations and applications, as they provide a user-friendly and easily usable manner for presenting information to and receiving instructions from a user.

SUMMARY

Conventional mechanisms such as those explained above suffer from a variety of deficiencies. One such deficiency is that conventional GUIs, when used to call up a dialog box, panel, drop-down menu or similar type object (collectively referred to herein as a graphical object) typically display the graphical object in a certain part of the display. The graphical object may occlude other objects in the display, thereby preventing the observation and use of the occluded objects.

Embodiments of the invention significantly overcome such deficiencies and provide mechanisms and techniques that display a graphical object and when the graphical object is fixated in the display, displays objects that otherwise would have been occluded by the graphical object in other parts of the display.

In a particular embodiment of a method for displaying graphical objects in a display, the method begins by receiving a first input from a user. In response to receiving the first input a graphical object is displayed. A second input is received from the user.

In response to receiving the second input the graphical object is fixated in the display. Objects occluded by the graphical object are displayed in an area of the display outside the area occupied by the graphical object.

In another embodiment of a method for displaying graphical objects in a display, the method begins by receiving a first input from a user. In response to receiving the first input a graphical object is displayed. The graphical object can be used at this time. A second input is received from the user. In response to receiving the second input the graphical object is removed from the display.

Other embodiments include a computer readable medium having computer readable code thereon for providing a method of displaying graphical objects in a display. The medium includes instructions for receiving a first input from a user and instructions for displaying a graphical object in the display in response to the first input. The medium further includes instructions for receiving a second input from the user and instructions for fixating the graphical object in the display in response to the second input. The medium further includes instructions for displaying objects that otherwise would have been occluded by the graphical object in an area of the display outside the area occupied by the graphical object.

Another embodiment includes a computer readable medium having computer readable code thereon for providing a method of displaying graphical objects in a display. The medium includes instructions for receiving a first input from a user and instructions for displaying a graphical object in the display in response to the first input. The graphical object can be used at this time. The medium further includes instructions for receiving a second input from the user and instructions for removing the graphical object in response to receiving the second input.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of displaying graphical objects as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of displaying graphical objects as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a computer device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
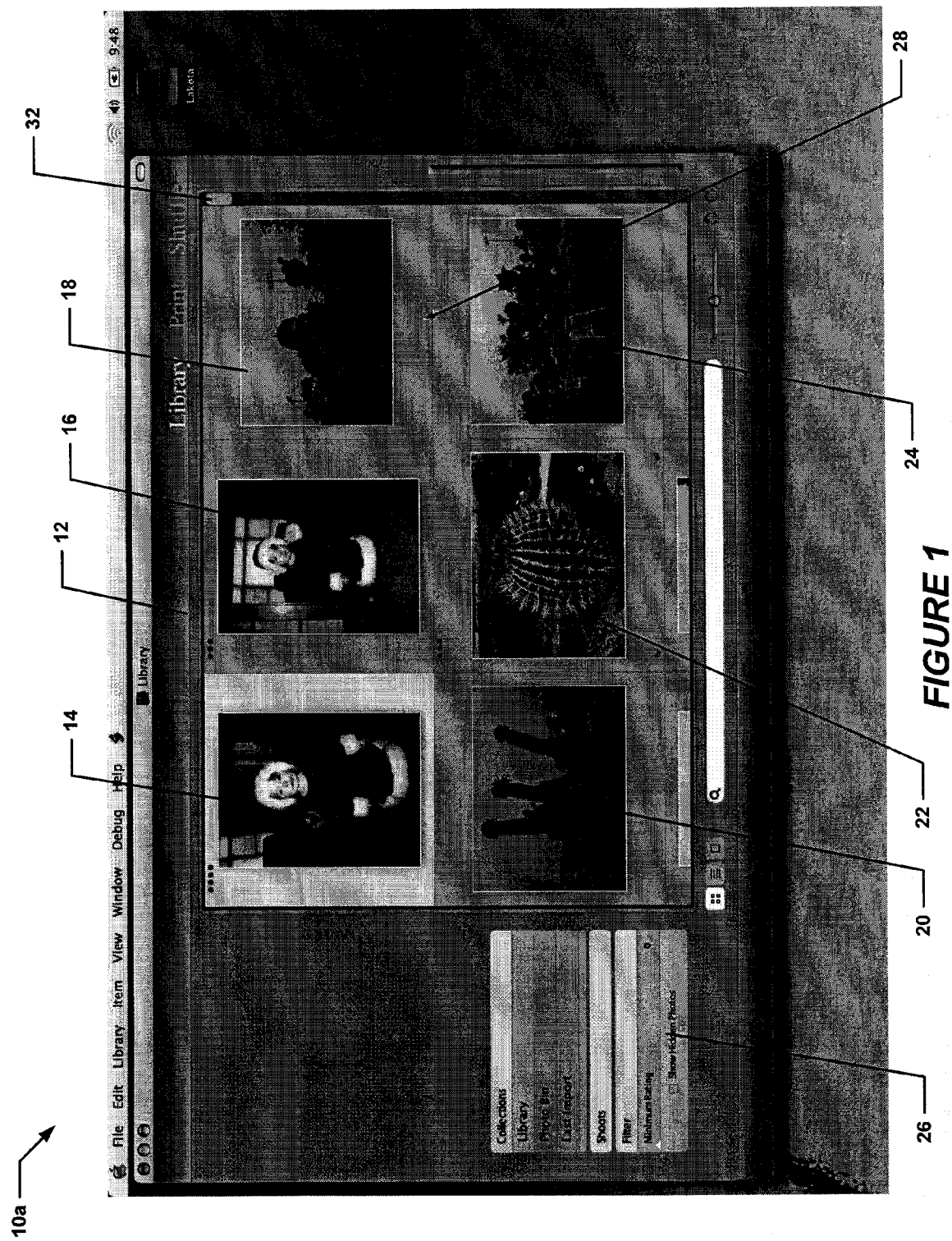
FIG. 1 is a first screen shot showing a display having several objects displayed therein.

Referring now to FIG. 1, a display 10a is shown. Display 10a shows a plurality of objects including object 12, and a plurality of picture objects 14, 16, 18, 20, 22 and 24. Display 10a also includes object 26 and a pointer 28, which is controlled by a mouse, keyboard or similar type device. Various other icons and objects are also shown.

Figure 2:
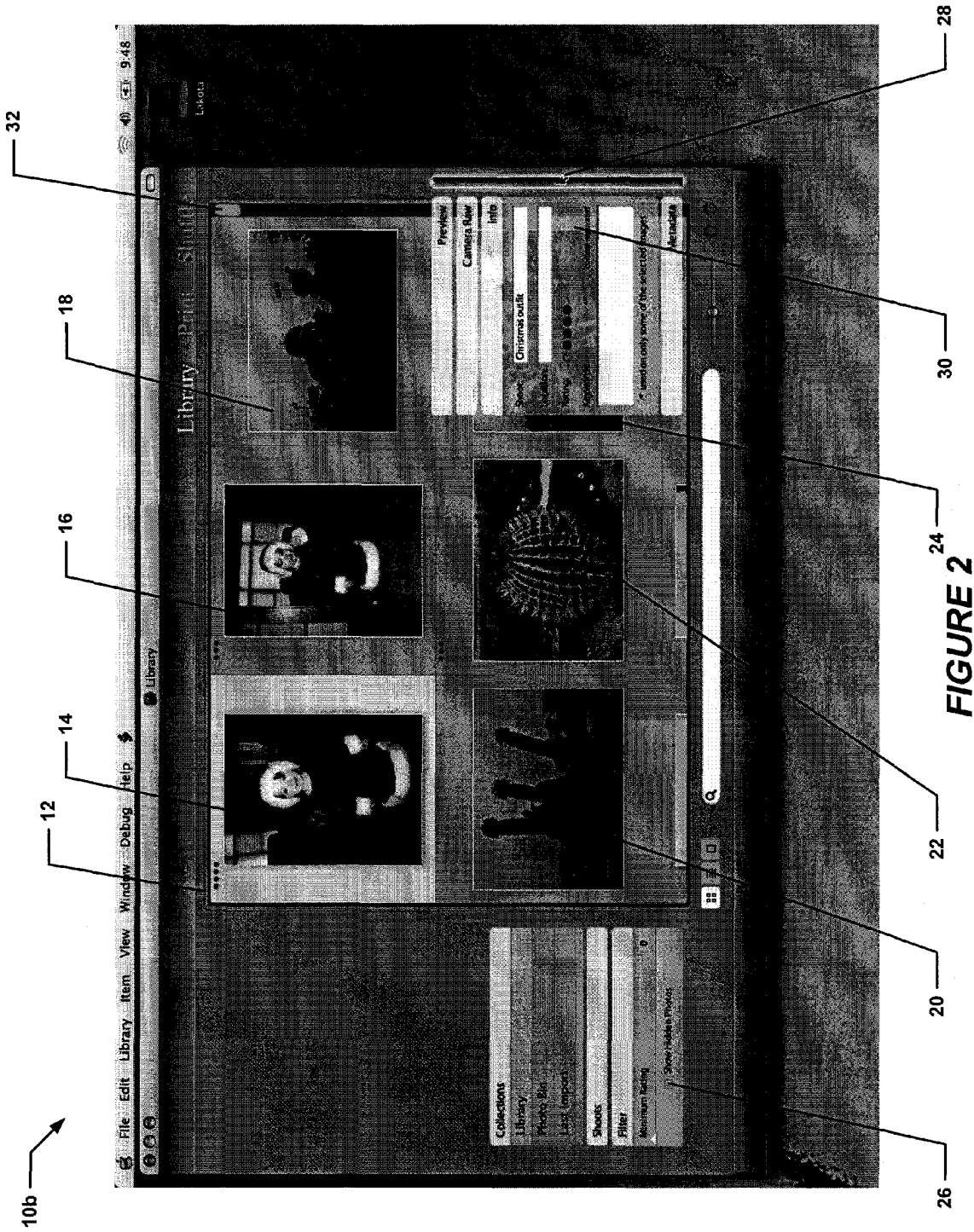
FIG. 2 is a second screen shot showing the display of FIG. 1 and further showing the display of a graphical object.

Referring now to FIG. 2, display 10b is shown. Display 10b is similar to display 10a in that display 10b contains the same objects and icons as display 10a. A difference between the two displays 10a and 10b is that in display 10b the pointer 28 has been moved and has triggered the display of graphical object 30. The pointer has been moved by a first user action such as moving a mouse in order to position the pointer 28 to cause the graphical object 30 to be displayed (also referred to as a mouse over event). Moving a mouse is only one way of causing this action as various other ways, such as by the pressing of a predetermined key on a keyboard, can also cause the display of graphical object 30.

In this particular embodiment, the graphical object 30 has been displayed with a relatively translucent portion, which helps in making the object 24 being occluded by graphical object 30 somewhat visible to the user.

Figure 3:
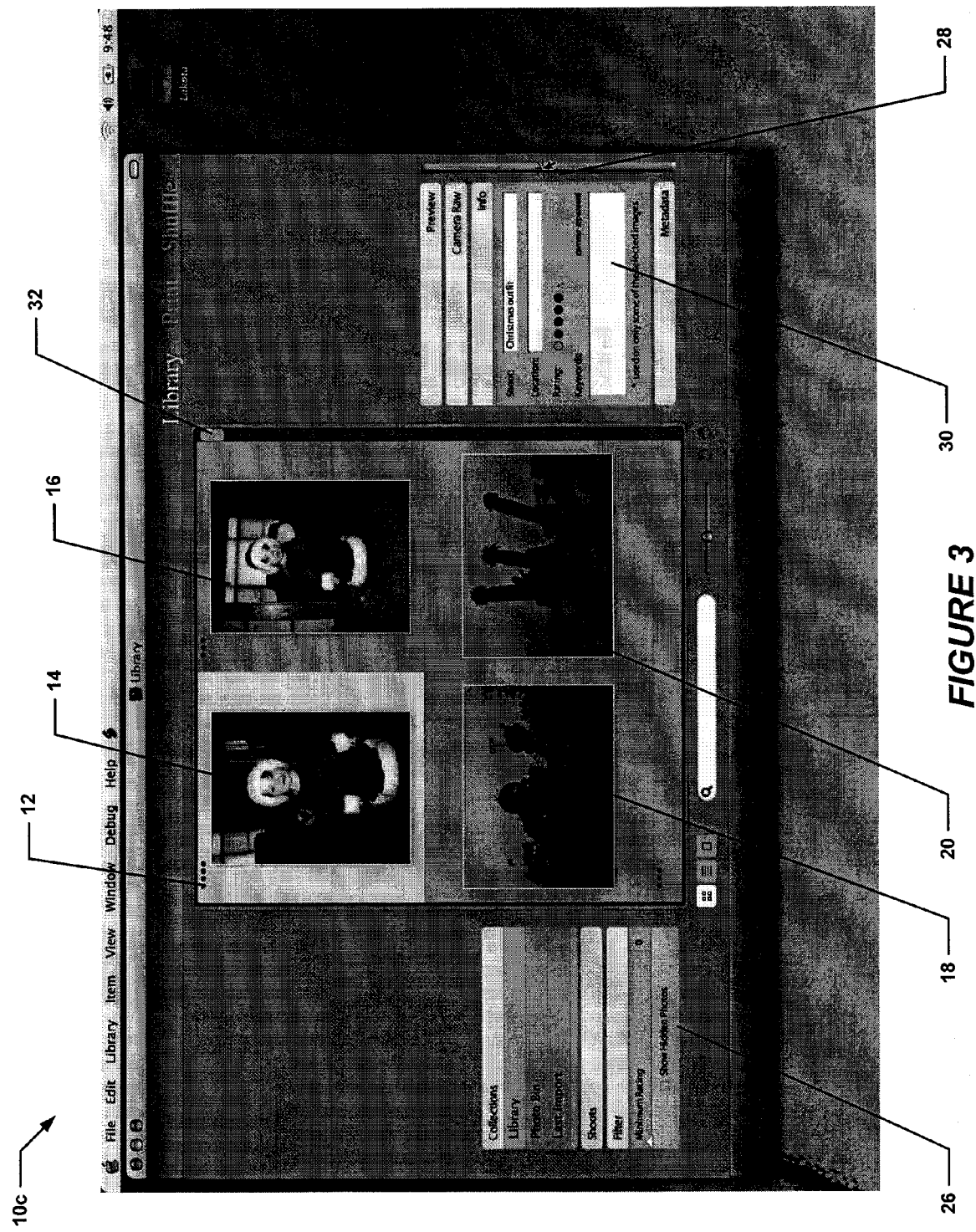
FIG. 3 is a third screen shot showing the graphical object fixated in the display and showing that objects that otherwise would have been occluded by the graphical object are displayed in other areas of the display, in accordance with embodiments of the invention.

Referring now to FIG. 3, display 10c is shown. In display 10c, pointer 28 shows that a second user action has occurred, such as a mouse click or a keyboard key release. As a result, several things have occurred. Graphical object 30 has been fixated on the screen. As such, graphical object 30 can be used by a user, such as by the user entering text in to the various fields of the graphical object 30. Furthermore, graphical object 30 is no longer occluding any objects. In response to the second user action the system has determined whether any objects are occluded by the graphical object, has determined space in the display that is not occupied by an object (other than the space occupied by the occluded object) and has displayed the formerly occluded object in the space not occupied by another object. While the object 12 formerly displayed a collection of picture objects as a first row of three picture objects (picture objects 14, 16 and 18) and a second row of three picture objects (picture objects 20, 22 and 24) object 12 has been resized to fit within the space not occupied by other objects to display a first row of two picture objects (picture objects 14 and 16) and a second row of picture objects (18 and 20). Not shown is a third row of picture objects 22 and 24, which can be made visible by moving slide bar 32 to a lower position. None of the objects are occluded by graphical object 30.

Referring back to FIG. 2, picture object 24 was occluded by graphical object 30. As a result, the object 24 has been displayed such that it is no longer occluded by graphical object 30. Now, object 12 shows picture objects in a different arrangement such that picture object 24 is no longer occluded by graphical object 30.

The graphical object can be removed from the display by third user action, such as a mouse click on the graphical object or a key release of a predetermined key after a predetermined period of time has elapsed.

Other embodiments include using a key press of a predetermined key (e.g. the TAB key) or a mouse over event wherein a graphical object is displayed while the key is held down or the mouse over event is present. The graphical object can be used by the user via a mouse or other device, and when the key is released or the mouse pointer is moved off the object, the graphical object is removed from the display. Alternately, if the key is pressed and released quickly (before a predetermined amount of time has elapsed) the graphical object is fixated on the display and any objects that would have been otherwise occluded by the graphical object are displayed in another area of the display.

Figure 4A:
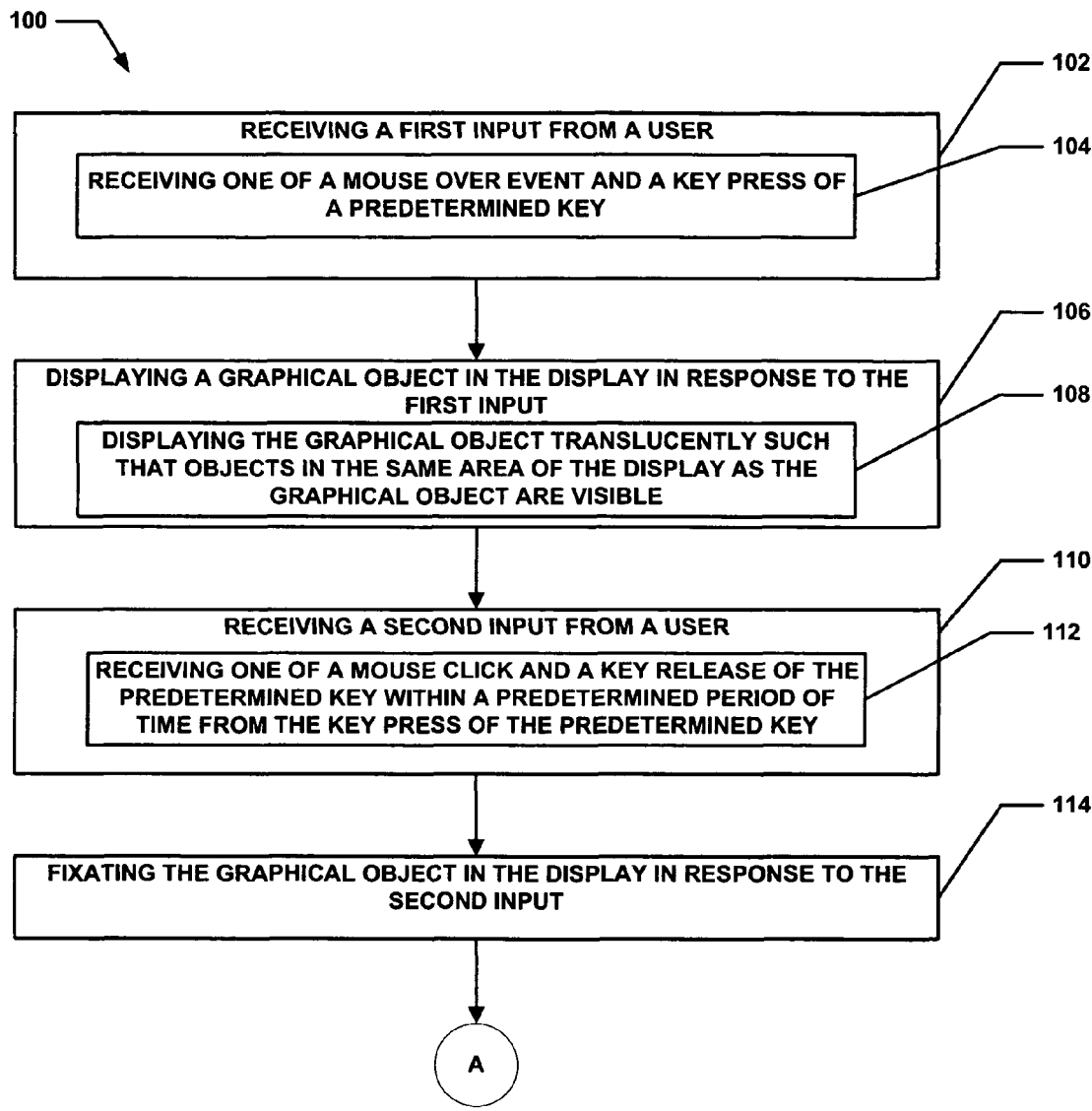
FIGS. 4A and 4B are flow diagrams depicting a first method of displaying graphical objects in accordance with embodiments of the invention.
Figure 4B:
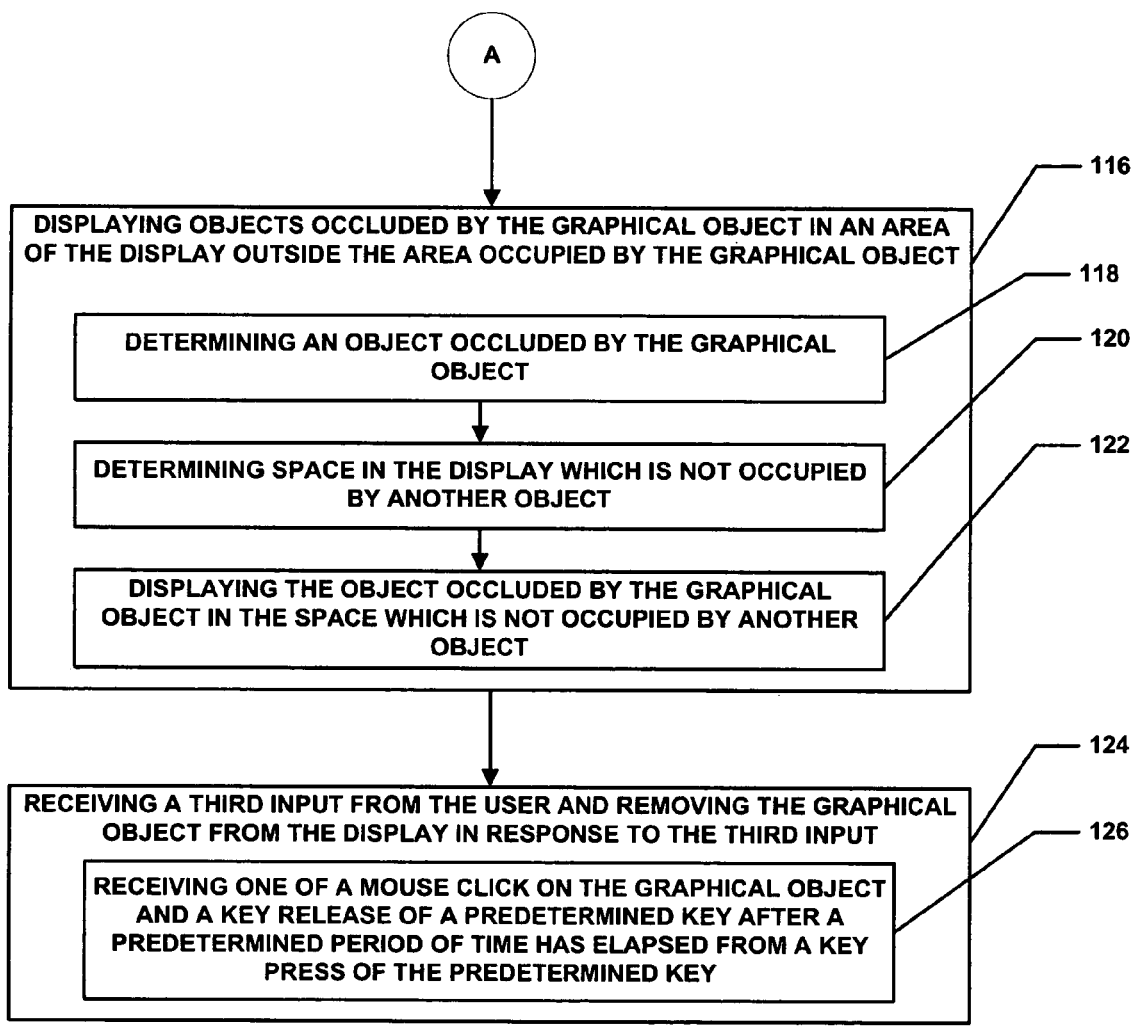
Figure 5:
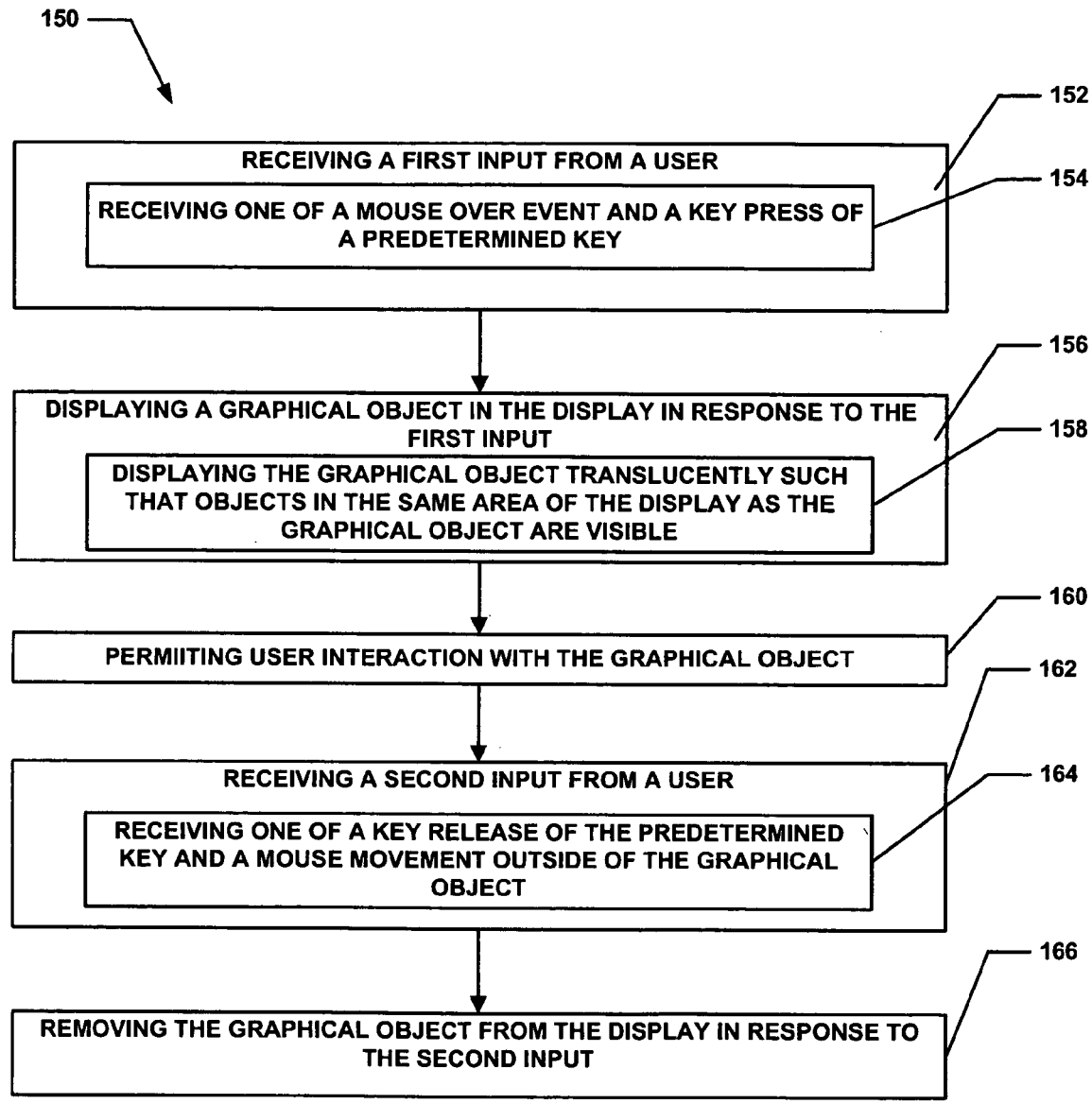
FIG. 5 is a second flow diagram depicting a second method of displaying graphical objects in accordance with embodiments of the invention.

A flow chart of the presently disclosed methods is depicted in FIGS. 4A, 4B and 5. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 4A and 4B, a particular embodiment of a method 100 of displaying graphical objects in a display is shown. The method 100 starts with processing block 102 wherein a first input from a user is received. As shown in processing block 104, the receiving of a first input comprises receiving one of a mouse over event and a key press of a predetermined key. A mouse over event is performed when the pointer is moved by operation of a mouse or similar device over a particular object in the display.

In processing block 106 a graphical object is displayed in the display in response to the first input. The graphical object may be a dialog box, a panel, a drop-down menu or similar type graphical object.

Processing block 108 recites that the displaying of a graphical object in the display in response to the first input comprises displaying the graphical object translucently such that objects in the same area of the display as the graphical object are somewhat visible. This is useful for allowing the user to view some of the object occluded by the graphical object.

In processing block 110 a second input from the user is received. As shown in processing block 112, receiving a second input comprises receiving a mouse click or receiving a key release of the predetermined key within a predetermined period of time from the key press of the predetermined key.

In processing block 114, the graphical object is fixated in the display in response to receiving the second input as described in processing block 110. Thus the mouse click or key release after a key press within the predetermined period of time fixes the graphical object within the display. As a result of the fixating of the graphical object within the display, other objects in the display may be occluded by the graphical object.

As recited in processing block 116, objects occluded by the graphical object are displayed in an area of the display outside the area occupied by the graphical object. As a result no objects are occluded by the graphical object. In order to display the occluded objects in other parts of the display, processing block 118, 120 and 122 are performed. In processing block 118 an object occluded by the graphical object are determined. In processing block 120, space in the display that is not occupied by other objects is also determined, and in processing block 122 the object occluded by the graphical object are displayed in the space that is not occupied by another object.

In processing block 124, a third input is received from the user. This third input results in closing or removing the graphical object from the display. As shown in processing block 126 the third input comprises one of a mouse click on the graphical object or a key release of a predetermined key after a predetermined period of time has elapsed from a key press of the predetermined key.

A particular embodiment of another method 150 of displaying graphical objects in a display is shown in FIG. 5. The method 150 starts with processing block 152 wherein a first input from a user is received. As shown in processing block 154, the receiving of a first input comprises receiving one of a mouse over event and a key press of a predetermined key.

In processing block 156 a graphical object is displayed in the display in response to the first input. The graphical object may be a dialog box, a panel, a drop-down menu or similar type graphical object. The object may be used by the user at this time.

Processing block 158 recites that the displaying of a graphical object in the display in response to the first input comprises displaying the graphical object translucently such that objects in the same area of the display as the graphical object are visible.

In processing block 160 the user is permitted to interact with the graphical object. For example, when the first user input is a key press, the user can use a mouse to activate click boxes or to select items in the graphical object. Alternately, if the first user action is a mouse over event, the user can use a keyboard to enter textual data in the graphical object.

In processing block 162 a second input from the user is received. As shown in processing block 164, receiving a second input comprises receiving a key release of the predetermined key or receiving a mouse movement outside the graphical object.

In processing block 166, in response to receiving the second input from the user, the graphical object is closed or removed from the display.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method of displaying graphical objects in a display in which a computer system performs operations comprising:

displaying a graphical object in the display in response to receiving a first input;

fixating said graphical object in the display in response to receiving a second input; and in response to said fixating, displaying an object that would have been occluded by said fixating said graphical object in an area of the display outside the area occupied by said graphical object, wherein the displayed object that would have been occluded comprises a window object within which a plurality of picture objects are displayed, each picture object showing a digital photograph, and wherein at least a portion of the window object and at least one picture object would have been occluded, and wherein, in response to said fixating, displaying the object that would have been occluded comprises:

resizing the window object so that no portion of the window object is occluded by the graphical object; and redisplaying each picture object within the resized window object so that no picture object is occluded.

2. The method of claim 1 further comprising receiving a third input and removing said graphical object from the display in response to said third input.

3. The method of claim 1 wherein said displaying an object that would have been occluded by said fixating said graphical objects comprises:

determining an object occluded by said graphical object;

determining space in said display which is not occupied by another object; and displaying said object occluded by said graphical object in said space that is not occupied by another object.

4. The method of claim 1 wherein said displaying a graphical object in the display in response to said first input comprises displaying said graphical object translucently such that objects in the same area of the display as said graphical object are visible.

5. The method of claim 1 wherein displaying a graphical object in the display comprises:

displaying said graphical object with a graphical object height and a graphical object width; and wherein fixating said graphical object in the display comprises:

rendering said graphical object while maintaining the graphical object height and the graphical object width.

6. The method of claim 1 wherein the area of the display outside the area occupied by said graphical object is unconstrained by a horizontal or a vertical position of the displayed object had the displayed object been occluded, such that neither of the displayed object and the graphical object is occluded by the other.

7. The method of claim 1, wherein the picture objects are displayed within the window object in a plurality of rows having a respective number of picture objects, and wherein resizing the window object includes reducing a number of picture objects in the plurality of rows such that the picture objects are in a different arrangement and no picture object is occluded.

8. The method of claim 7 further comprising:

permitting user interaction with said graphical object, the interaction including entering information regarding the digital photograph shown in the picture object that would have been occluded by said fixating said graphical object.

9. A physical computer readable storage medium having computer readable code stored thereon for providing a method of displaying graphical objects in a display, the medium including instructions in which a computer system performs operations comprising:

instructions for displaying a graphical object in the display in response to receiving a first input;

instructions for fixating said graphical object in the display in response to receiving a second input; and instructions for in response to said fixating, displaying objects that would have been occluded by said fixating said graphical object in an area of the display outside the area occupied by said graphical object, wherein the displayed objects that would have been occluded include a window object within which a plurality of picture objects are displayed, each picture object showing a digital photograph, and wherein at least a portion of the window object and at least one picture object would have been occluded, and wherein, in response to said fixating, displaying objects that would have been occluded comprises:

resizing the window object so that no portion of the window object is occluded by the graphical object; and redisplaying each picture object within the resized window object so that no picture object is occluded.

10. The computer readable medium of claim 9 further comprising instructions for receiving a third input and instructions for removing said graphical object from the display in response to said third input.

11. The computer readable medium of claim 9 wherein said instructions for displaying objects that would have been occluded by said fixating said graphical objects comprises:

instructions for determining an object occluded by said graphical object;

instructions for determining space in said display which is not occupied by another object; and instructions for displaying said object occluded by said graphical object in said space that is not occupied by another object.

12. The computer readable medium of claim 9 wherein said instructions for displaying a graphical object in the display in response to said first input comprises instructions for displaying said graphical object translucently such that objects in the same area of the display as said graphical object are visible.

13. The computer readable medium of claim 9 wherein said instructions for displaying a graphical object in the display in response to said first input comprise instructions for displaying said graphical object translucently such that objects in the same area of the display as said graphical object are visible.

14. The computer readable medium of claim 9 wherein said instructions for displaying objects that would have been occluded by said fixating said graphical object in an area of the display outside the area occupied by said graphical object comprises:

instructions for displaying a first subset of the objects that would have been occluded by said fixating said graphical object in an area of the display;

instructions for indicating that a second subset of the objects that would have been occluded by said fixating said graphical object is not displayed in the area of the display; and instructions for indicating that the second subset is available for viewing in the area of the display.

15. The computer readable medium of claim 9 wherein the area of the display outside the area occupied by said graphical object is unconstrained by a horizontal or a vertical position of the displayed object had the displayed object been occluded, such that neither of the displayed object and the graphical object is occluded by the other.

16. The computer readable medium of claim 9 wherein the picture objects are displayed within the window object in a plurality of rows having a respective number of picture objects, and wherein resizing the window object includes reducing a number of picture objects in the plurality of rows such that the picture objects are in a different arrangement and no picture object is occluded.

17. The computer readable medium of claim 16 further comprising:
  instructions for permitting user interaction with said graphical object, the interaction including entering information regarding the digital photograph shown in the picture object that would have been occluded by said fixating said graphical object.

* * * * *